(12) United States Patent
Matsuo et al.

(10) Patent No.: US 6,704,433 B2
(45) Date of Patent: Mar. 9, 2004

(54) HUMAN TRACKING DEVICE, HUMAN TRACKING METHOD AND RECORDING MEDIUM RECORDING PROGRAM THEREOF

(75) Inventors: Hideaki Matsuo, Fukuoka (JP); Kazuyuki Imagawa, Fukuoka (JP); Yuji Takata, Iizuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 565 days.

(21) Appl. No.: 09/741,384

(22) Filed: Dec. 20, 2000

(65) Prior Publication Data

US 2001/0005219 A1 Jun. 28, 2001

(30) Foreign Application Priority Data

Dec. 27, 1999 (JP) .......................................... 11-369282

(51) Int. Cl.[7] .................................................. G06K 9/00
(52) U.S. Cl. ........................ 382/103; 382/106; 382/219; 382/162; 382/190; 348/169; 348/699
(58) Field of Search ................................ 382/103, 106, 382/190, 219, 162; 348/169, 699, 20; 340/426.26, 565; 356/141.1

(56) References Cited

U.S. PATENT DOCUMENTS

| | | | | |
|---|---|---|---|---|
| 5,243,418 A | * | 9/1993 | Kuno et al. ................. | 348/155 |
| 5,710,875 A | * | 1/1998 | Harashima et al. ......... | 345/419 |
| 5,748,775 A | * | 5/1998 | Tsuchikawa et al. ....... | 382/190 |
| 6,453,069 B1 | * | 9/2002 | Matsugu et al. ............ | 382/173 |
| 6,476,857 B1 | * | 11/2002 | Agatsuma et al. .......... | 348/152 |
| 6,480,270 B1 | * | 11/2002 | Studnicka et al. ......... | 356/141.1 |
| 2002/0060686 A1 | * | 5/2002 | Matsumoto et al. ........ | 345/582 |
| 2002/0164074 A1 | * | 11/2002 | Matsugu et al. ............ | 382/173 |
| 2003/0091225 A1 | * | 5/2003 | Chen .......................... | 382/145 |
| 2003/0117516 A1 | * | 6/2003 | Ishida et al. ................ | 348/348 |

OTHER PUBLICATIONS

*Ptracker: Real–Time Tracking of Human Motion*, by Akio Takasima, Hiroshi Futsuhara, Takeshi Ohashi et al., Faculty of Computer Science and Systems Engineering, Kyushu Institute of Technology, dated 1999, PRMU99–30–36.
*Automatic Intruder Detection and Tracking System with Pan–Tilt–Zoom Camera*, by Tetsuji Haga, Hideto Fujiwara, and Kazuhiko Sumi, Mitsubishi Electric Corp, published in The Institute of Electronics Information and Communication Engineers PRMU99–67, dated Sep. 1999, pp. 23–30.

* cited by examiner

Primary Examiner—Bhavesh M. Mehta
Assistant Examiner—Barry Choobin
(74) Attorney, Agent, or Firm—Darby & Darby (57) ABSTRACT

A human tracking device according to the present invention stably tracks a human with good perception of the distance to a human with high resistance against disturbance. A camera image is divided into a human region and a background region. Then, each area of the image is judged whether or not the human region can be divided into a plurality of blob models corresponding to parts of a human. The parts of a human are preferably the head, trunk and legs. When the result of the judgment is "YES", a plurality of human blob models are produced based on the human region. When the result of the judgment is "NO", a single human blob model is produced based on the human region. The human is then tracked based on these human blob models. In this way, the human can be stably tracked with good perception of the distance to the human and with high resistance against disturbance.

15 Claims, 12 Drawing Sheets

| region number | coordinate x | coordinate y | nearest BBN | distance | decided BBN |
|---|---|---|---|---|---|
| 0 | 0 | 0 | 0 | 64 | 0 |
| 0 | 1 | 0 | 0 | 65 | 0 |
| 0 | 2 | 0 | 0 | 63 | 0 |

BBN : background blob model number

Fig. 10

| region number | coordinate x | coordinate y | nearest BBN | distance | decided BBN |
|---|---|---|---|---|---|
| 13 | 53 | 48 | 13 | 64 | 13 |
| 13 | 54 | 48 | 13 | 65 | 13 |
| 13 | 55 | 48 | 13 | 63 | 13 |
| 13 | 105 | 92 | 14 | 1023 | OTHER_FLAG |
| 13 | 106 | 92 | 11 | 1222 | OTHER_FLAG |

BBN : background blob model number

HUMAN TRACKING DEVICE, HUMAN TRACKING METHOD AND RECORDING MEDIUM RECORDING PROGRAM THEREOF

BACKGROUND OF THE INVENTION

The present invention relates to a human tracking device and related techniques which are incorporated into a monitoring system that monitors intruders.

Recently, studies for treating a human image contained in a camera image by image-processing have been popularly made. Some of the studies concern a method for detecting moving objects using time-lapse of sequential camera images. This method has insufficient performance to track humans.

Studies, practically applicable to tracking humans, are disclosed in the following two published papers.

The first paper, published in the Institute of Electronics, Information and Communication Engineers papers, PRMU99 No. 67, pp. 23–30 by Haga et al, concerns the combination of time-lapse of camera images with template matching. This technique relates to an intruder monitoring system which automatically finds an intruder and tracks him (or her) while zooming and panning. This monitoring system has two tracking algorithms, i.e., template matching and interframe difference. Errors in the tracking point obtained by template matching are corrected using the interframe differences, thereby realizing stable tracking.

However, in template matching, this technique has the drawback that the tracking tends to fail when a human changes his (or her) posture. This problem arises because a template region is rectangulary defined and matching is carried out using information within the entire template.

In the second technique, published in the Institute of Electronics, Information and Communication Engineers papers, PRMU99 No. 119, pp. 25–32 by Takashima et al, a human is represented in a simple way with three blob models (near-spherical blocks represented with the position on the coordinate and the similarity of colors) so as to track him (or her). This concept of the blob models is based on PFinder developed by MIT Media Lab.

According to PFinder, when a human is situated near the camera and therefore is represented by a relatively large image in a camera image, the human can be stably tracked. However, when the human is situated far from the camera and therefore is represented by a small image, the human image is difficult to distinguish from the noise because the small image of the human is still treated as a three-blob model. As a result, the likelihood of tracking failure is increased. Moreover, a non-human object may possibly be regarded as a human. Furthermore, if false modeling is performed at the initial step of processing, this processing is likely to be inconsistent, which may result in the failure of successive processing.

OBJECTS AND SUMMARY OF THE INVENTION

The present invention is devised in view of the above-described problems. The present invention has an object of providing a human tracking device which is capable of stably tracking a human, independently of the distance between the human and the camera, and related techniques thereof.

According to the first aspect of the present invention, a camera image is divided into at least a human region and a background region. It is judged whether or not it is possible to divide the human region into a plurality of blob models corresponding to parts of a human body. When the result of the judgment is YES, a plurality of human blob models are produced based on the human region. When the result of the judgement is NO, a single human blob model is produced based on the human region. Human tracking is performed based on the resulting human blob models.

With this structure, the human tracking device has greater resistance disturbing factors such as noise, thereby improving stability. Although only rough tracking is possible with a single human blob model, such tracking is considered sufficient for a human appearing in a distant region of the image because it is generally considered that the threat posed by a human at a great distance from an object or area being protected by human tracking is likely to be small. On the other hand, a human in a close-by region of the image, and is therefore represented by a large image, poses a much greater potential threat. The larger image enables the much more accurate multiple-blob tracking.

According to the second aspect of the present invention, the plurality of blob models are three blob models, that is, those of the head, the trunk and the legs.

With this structure, the human can be represented in a simple way with three blob models of the head, the trunk and the legs, whereby stable tracking can be performed. Moreover, only from the positional relationship of these three human blob models, the posture of the human such as standing, sitting, lying and the like can be derived in a simple way.

According to the third aspect of the present invention, a divisional condition judgment means gives the result of the judgment with reference to the distance information of the human region.

With this structure, divisional condition judgments can be appropriately carried out using the distance information.

According to the fourth aspect of the present invention, the divisional condition judgment means gives the result of the judgment with reference to the size of the human region.

With this structure, a human image can be flexibly treated with reference to the size of the human region. For example, when a human having a large physique appears in a rather distant region of the image, a plurality of human blob models are produced, whereas when a small baby appears in a close-by region of the image, a single blob model is produced.

According to the fifth aspect of the present invention, a plurality of background blob models are produced based on the background region.

With this structure, blob models are also applied to the background region, thereby making it possible to treat the background in a simpler way.

According to the sixth aspect of the present invention, in addition to the fifth aspect of the present invention, a region division means obtains a minimum value of similarity between the pixel and the background blob models. When this minimum value is above a threshold value, the pixel is judged not to correspond to the background region.

With this structure, the comparison with the minimum value enables the ability to appropriately distinguish a pixel which does not correspond to the background region (that is, one which possibly, corresponds to a human region).

According to the seventh aspect of the present invention, in addition to the fifth aspect of the present invention, the background blob model is expressed to include X-Y coordinate average values and RGB average values of the region.

With this structure, blob models which faithfully and concisely reflect the features of the background region can be obtained.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
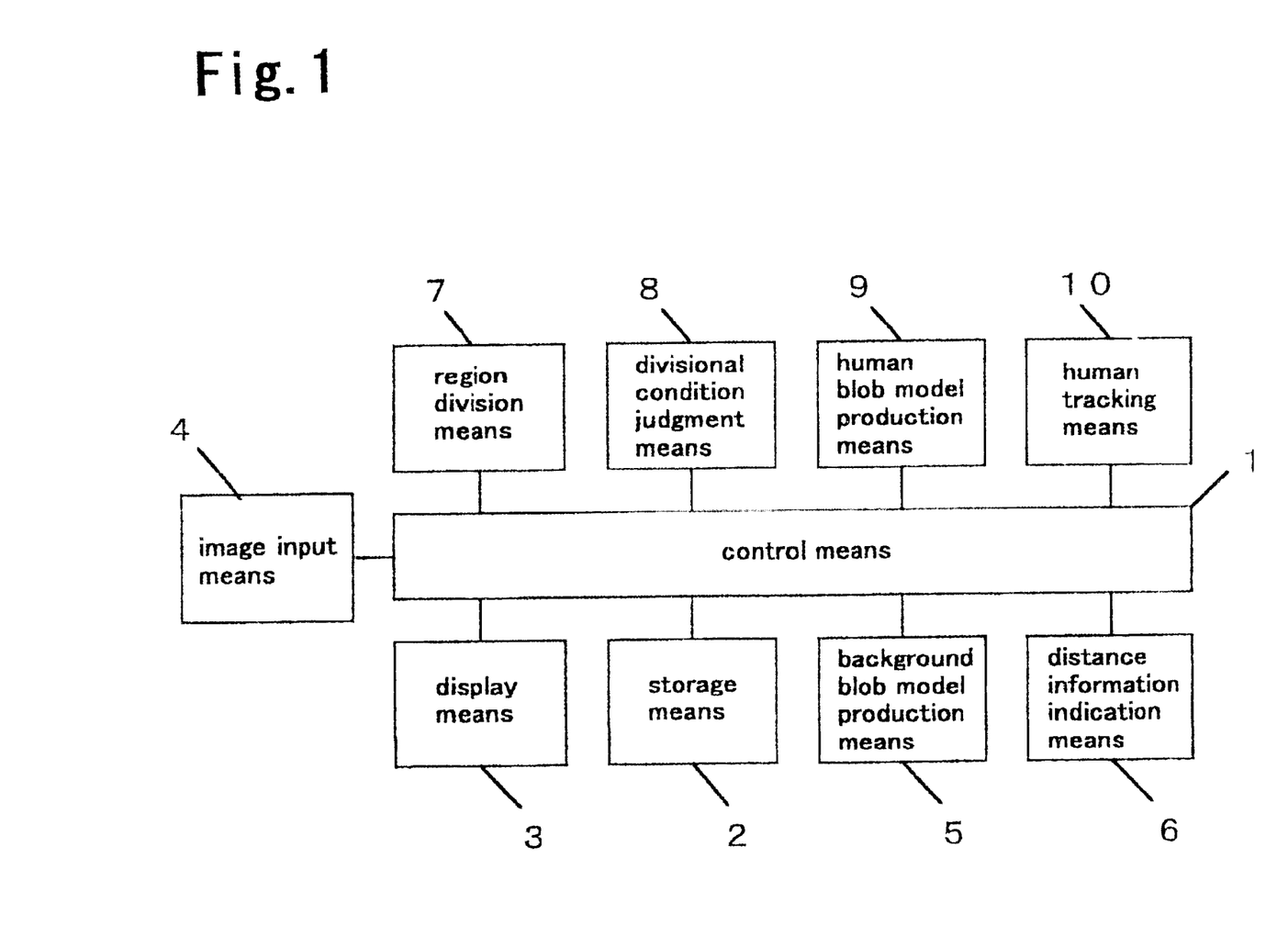
FIG. 1 is a block diagram of a human tracking device according to one embodiment of the present invention.

Referring to FIG. 1, a human tracking device according to the present invention includes a control means 1, consisting of a CPU (Central Processing Unit) and the like, that controls the other components to alternately perform image input, image initialization, and other processes.

A storage means 2 consists of a frame memory which stores image information inputted from an image input means 4 such as a camera. Storage means 2 also contains a random access memory (RAM) which stores a control program executed by the control means 1 as well as information necessary for the operation of the control program. The RAM also stores human blob models, background blob models and the like, which are described below.

A display means 3 monitors the current image from the image input means 4 and the human blob models. The display means 3 also serves as a user interface for distance information acquisition.

Figure 6:
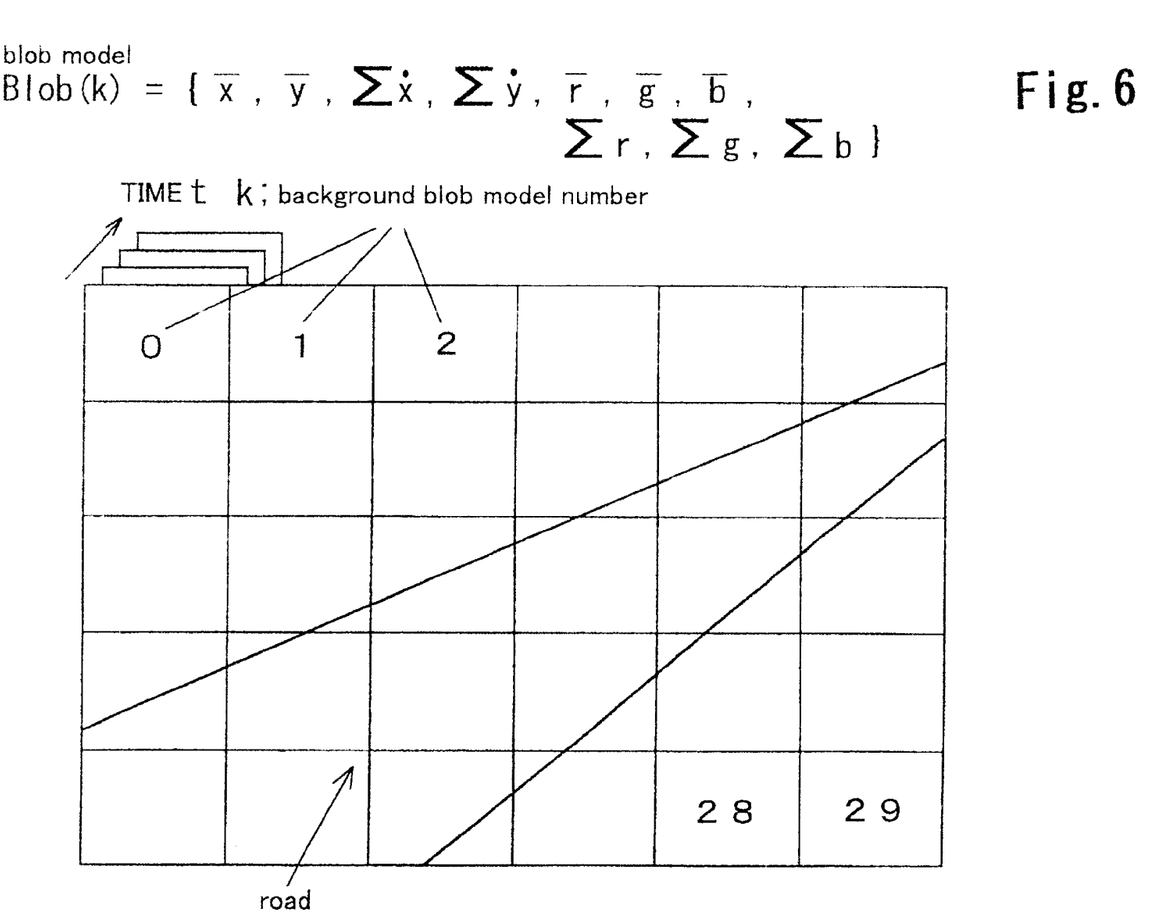
FIG. 6 is a diagram illustrating a background blob model of the human tracking device according to one embodiment of the present invention.

During initialization, a background blob model production means 5 vertically and horizontally divides the current camera image into a plurality of regions at equal intervals to produce background blob models of the respective divided regions. In this embodiment, as shown in FIG. 6, the camera image is divided into six regions in a horizontal direction and in five regions in a vertical direction at equal intervals (30 regions in total). Each divided region is identified by the region numeral 0, 1, 2, . . . , 29. Then, the background blob model is defined as expressed in the upper part of FIG. 6.

Each pixel in the image has five-dimensional information, that is, X-Y coordinate (x,y) and color information in the RGB color space (r,g,b). In these blob models, elements include an average value, variance and covariance of the X-Y coordinate, and an average value, variance and covariance of the above color information and so on, whereby the features of each divided region can be represented in a simple and faithful way.

The background blob model may be produced using only a single frame of the camera image, or it may be produced using an average image obtained by adding a plurality of frames.

Figure 7:
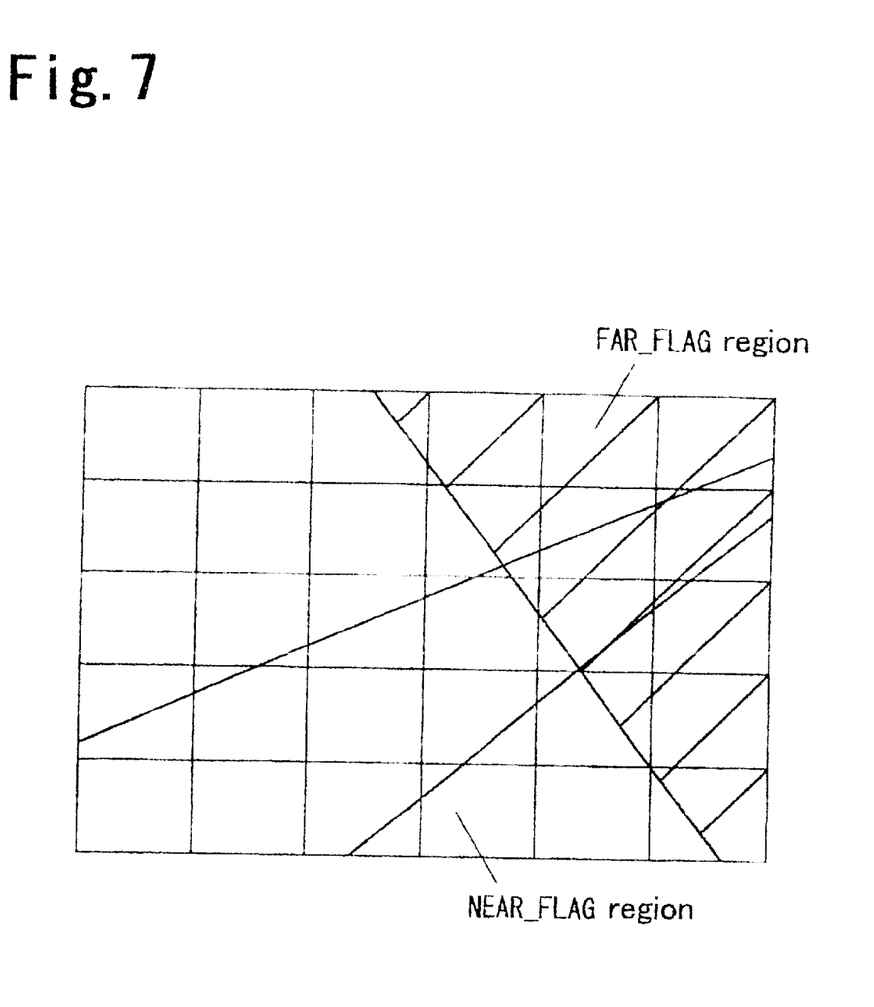
FIG. 7 is a diagram illustrating distance information of the human tracking device according to one embodiment of the present invention.

A distance information indication means 6 obtains information identifying the portions of the camera image that are distant from the camera and the portions of the camera image that are close-by. In this embodiment, as shown in FIG. 7, the camera image is shown to a user on display means 3. The user indicates a boundary between a close-by region and a distant region using a suitable input device such as, for example, a pointing device or a keyboard. The distance information of the regions is divided by this boundary.

Then, a close-by region is set with NEAR_FLAG while a distant region is set with FAR_FLAG. Although the entire camera image is divided into two regions by a straight line in FIG. 7, such a division is only exemplary. The entire camera image may be divided into three or more regions, depending on the geography. The shape of the boundary may by freely chosen. The shape may be, for example, one or more curves or a combination of a straight line and a curve. The system may measure a distance in the depth direction so as to automatically set the boundary. For this automatic setting, arbitrary methods can be used such as utilization of a distance sensor or the irradiation of light having a sin wave pattern, or utilization of parallax information obtained from corresponding points in the camera images taken by a stereo camera or a plurality of cameras. If the terrain is known, the distance information for each camera angle may be stored and retrieved as the camera line of sight is changed.

A region division means 7 divides the camera image into a human region and a background region. In this embodiment, pixels of a non-background region (i.e., a possible human region) are set with OTHER_FLAG while the pixels that probably do not contain a human are not set with OTHER_FLAG. This procedure will be described in greater detail below.

A divisional condition judgment means 8 examines whether or not the human region extracted by the region division means 7 should be represented with a plurality of blob models. Basically, the divisional condition judgment means 8 gives the result "Yes" for a human image (block of pixels) which appears close-by and is therefore large in the camera image and "No" for images other than the human images. This will be described below in greater detail.

A human blob model production means 9 produces three human blob models, that is, those of the face, the trunk and the legs when the result of the above judgment is "Yes". The human blob model production means 9 produces a single human blob model when the result of above judgment is "No". This will also be described in greater detail below.

A human tracking means 10 inputs the human blob models produced by the human blob model production means 9 so as to update the human blob model and the background blob model, thereby performing extraction of the human, tracking and simple judgment of his (or her) posture. Specifically, the following processing are performed.

(1) Since the human blob model set with FAR_FLAG is represented by a single human blob model, the central position of this human blob model is obtained as the central position of the human. The movement of the human is tracked through the locus of this central position of the human blob model.

(2) The human blob model set with NEAR_FLAG is represented by the above three human blob models. The blob model having a characteristic point obtained by Hough transform is determined as a face blob model while the blob models adjacent to the face blob model are determined as a trunk blob model, and a legs blob model in this order. The movement of the human is tracked through the locus of these blob models.

The human tracking means 10 judges the posture of the human in the following way. When the blob model of the head is situated on top and the aspect ratio of a circumscribed rectangle surrounding three blob models is within a threshold value, the human is judged to be "standing". When three blob models are arranged in a horizontal line, the human is judged to be "lying". In the cases where the blob model does not correspond to any of these two cases, the human is judged to be "sitting".

Figure 2:
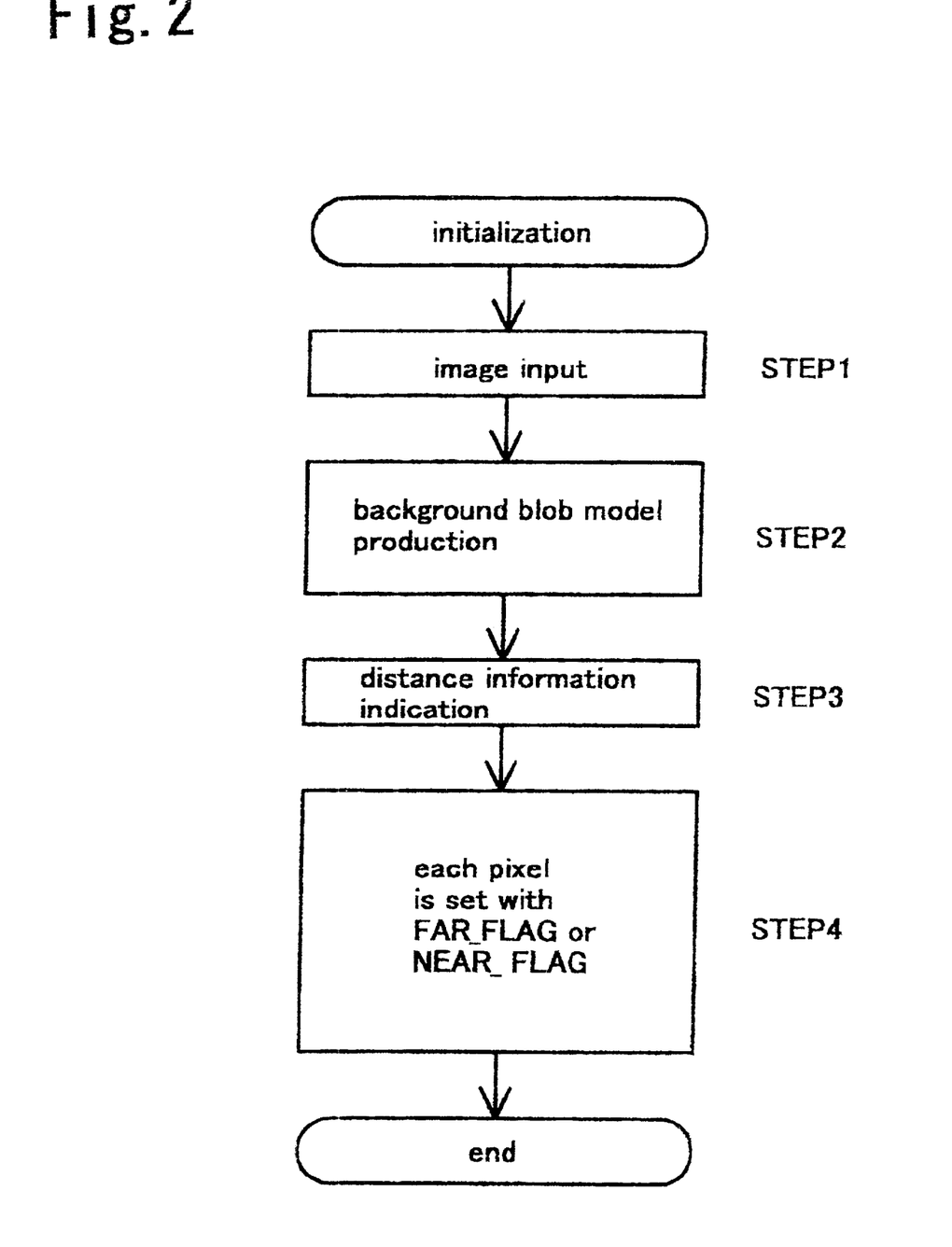
FIG. 2 is a flowchart of an initializing processing of the human tracking device according to one embodiment of the present invention.

Referring now to FIG. 2, the operation of the initialization will be described. First, at Step 1, the camera image (which, desirably, does not contain a human image) inputted from the image input means 4 is stored in a frame memory of the storage means 2. Next, based on the image stored in the frame memory, the background blob model production means 5 produces the background blob models (30 blob models in total) shown in FIG. 6. The distance information is obtained by the distance information indication means 6 (Step 3) as shown in FIG. 7. Then each pixel is set with FAR_FLAG or NEAR_FLAG (Step 4).

Figure 3:
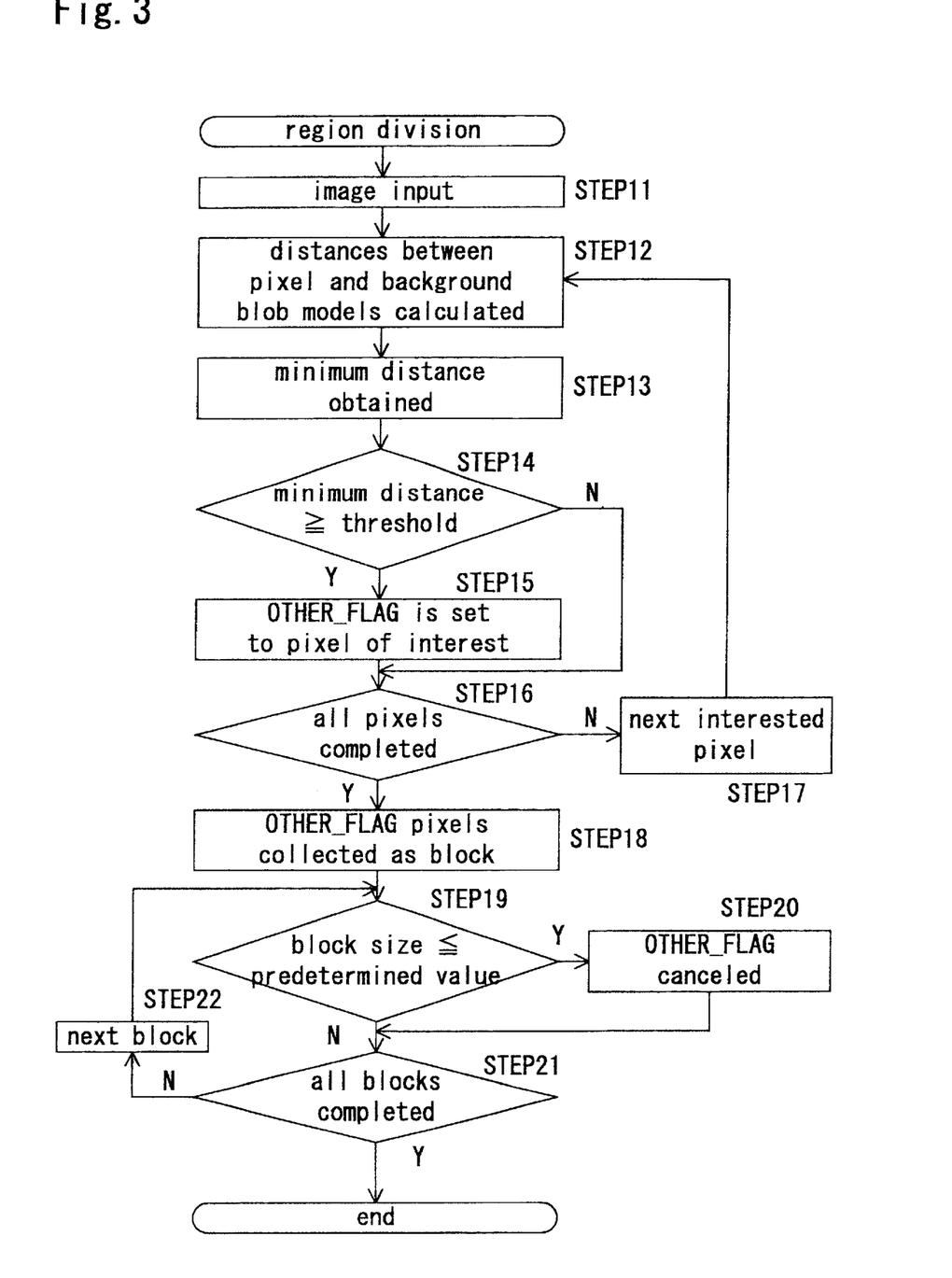
FIG. 3 is a flowchart of a region dividing process of the human tracking device according to one embodiment of the present invention.

Referring now to FIG. 3, the operation of the region division means 7 will be described. First, a camera image (in this case, a camera image which may contain a human image) is acquired from the image input means 4 (Step 11).

Then, a pixel of interest (in this embodiment, an upper-left pixel, at first) is selected from the camera image. The distances between the pixel of interest and each of the background blob models (the region numerals 0 through 29) is calculated (30 distances in total) (Step 12). Although a mahalanobis distance is obtained in this embodiment, since the distance between a point and a region (non-similarity) is calculated, other numeric values can substitute for the mahalanobis distance.

A minimum value of the distances is obtained (Step 13), and is compared with a threshold value (Step 14). When this minimum value is found to be above the threshold value as a result of the comparison, OTHER_FLAG is set to the pixel of interest since this pixel of interest is completely different from the background (that is, it is highly possible that this pixel of interest is that of the human image). Otherwise, OTHER_FLAG is not set to the pixel of interest.

Then, the above processing is repeated once for all pixels (Step 16) with update of a pixel of interest (Step 17).

The pixels to which the OTHER_FLAG is set are collected as a block (Step 18), and the size of this block is compared with a predetermined value (Step 19). When the size of the block is small, it is highly possible that this block represents noise or the like. Even if this block represents a human image, it may be a human situated extremely far away in the camera image. Accordingly, OTHER_FLAG is canceled from the pixels of this block (Step 20) since it is impractical to track this small human image. Otherwise, OTHER_FLAG remains set to the pixels. Then, the above processing are repeated for all blocks (Steps 21 and 22).

Figure 8:
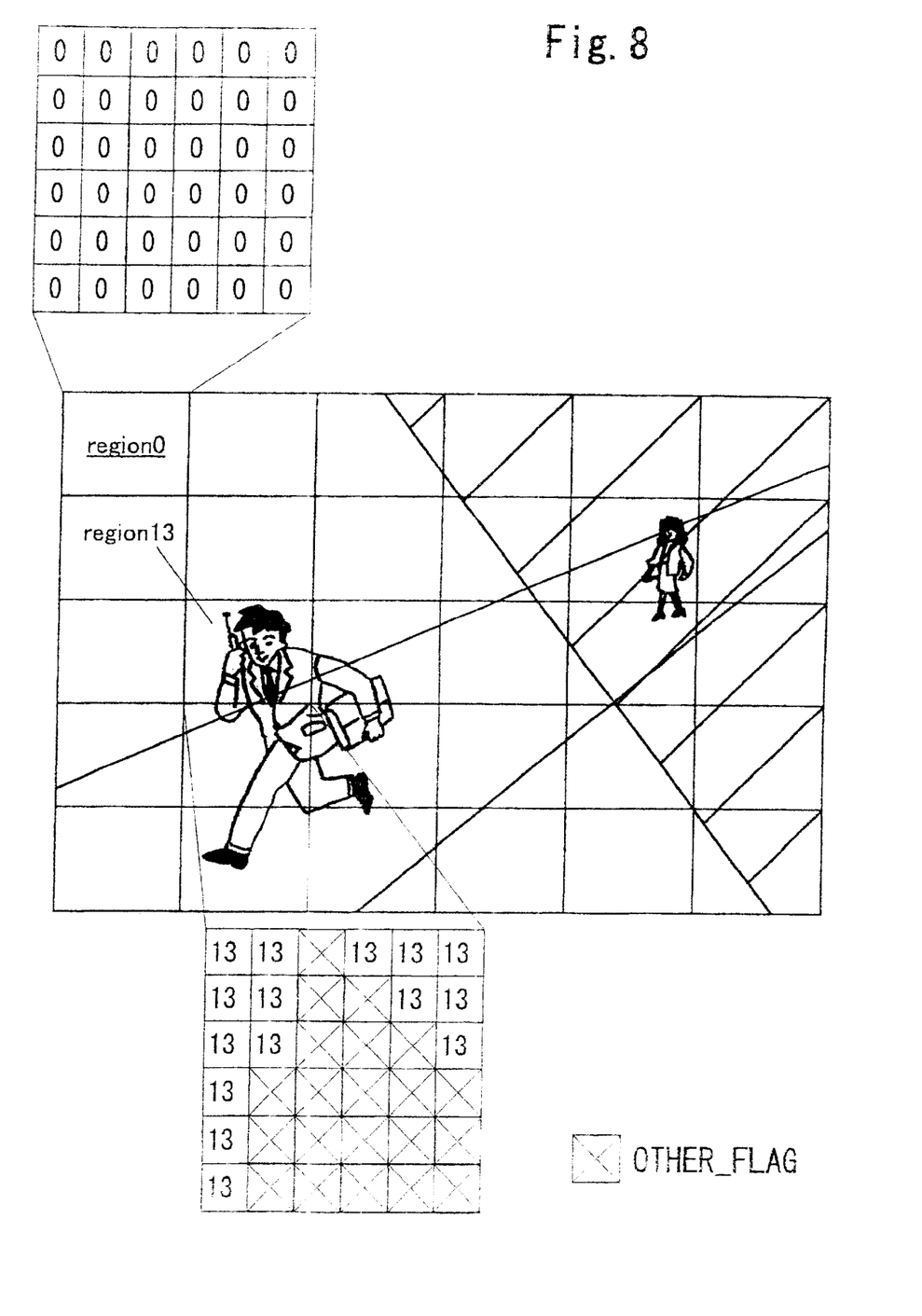
FIG. 8 is an exemplary diagram of OTHER_FLAG of the human tracking device according to one embodiment of the present invention.
Figure 9:
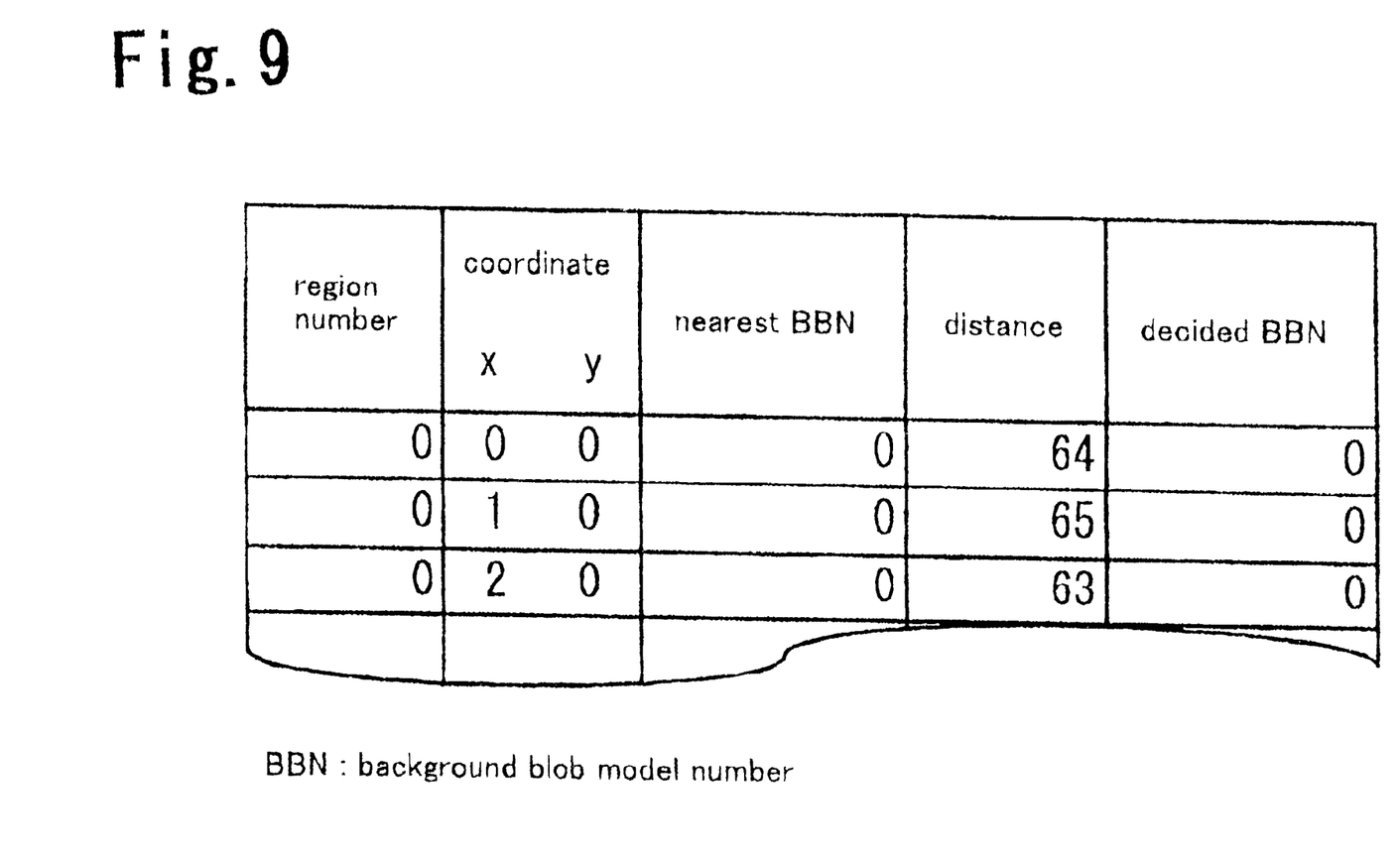
FIG. 9 is an exemplary diagram of pixel information of the human tracking device according to one embodiment of the present invention.

By these processes, when a camera image, for example, as shown in FIG. 8 (in the close-by region of the camera image, a man appears as a large image while, in the distant region, a woman appears as a small image) is provided, the pixels in the background region on the upper-left side of the camera image (region 0) are as shown in FIG. 9. As can be seen, all distances are below the threshold value (in this case, 100). Since the region considered to have the minimum distance is the region (region 0), OTHER_FLAG is not set thereto.

Figure 10:
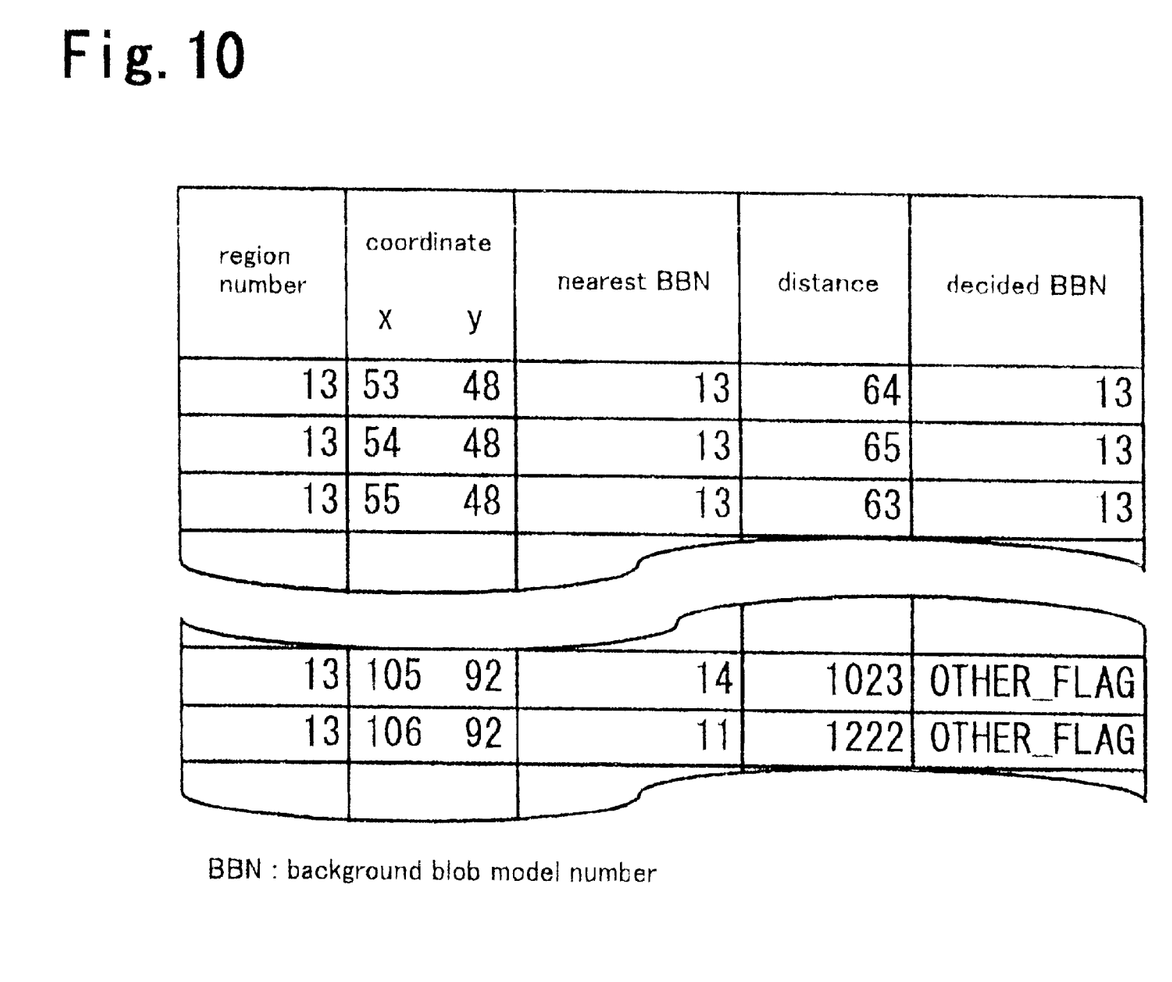
FIG. 10 is an exemplary diagram of pixel information of the human tracking device according to one embodiment of the present invention.

On the other hand, in the background region of region 13 where a man's face is located (this is however not certain at this moment in the process), the pixels are as shown in FIG. 10. More specifically, since pixels such as (x,y)=(105,92) and (106,92) have extremely large distances (1023 and 1222), OTHER_FLAG is set thereto.

Figure 11:
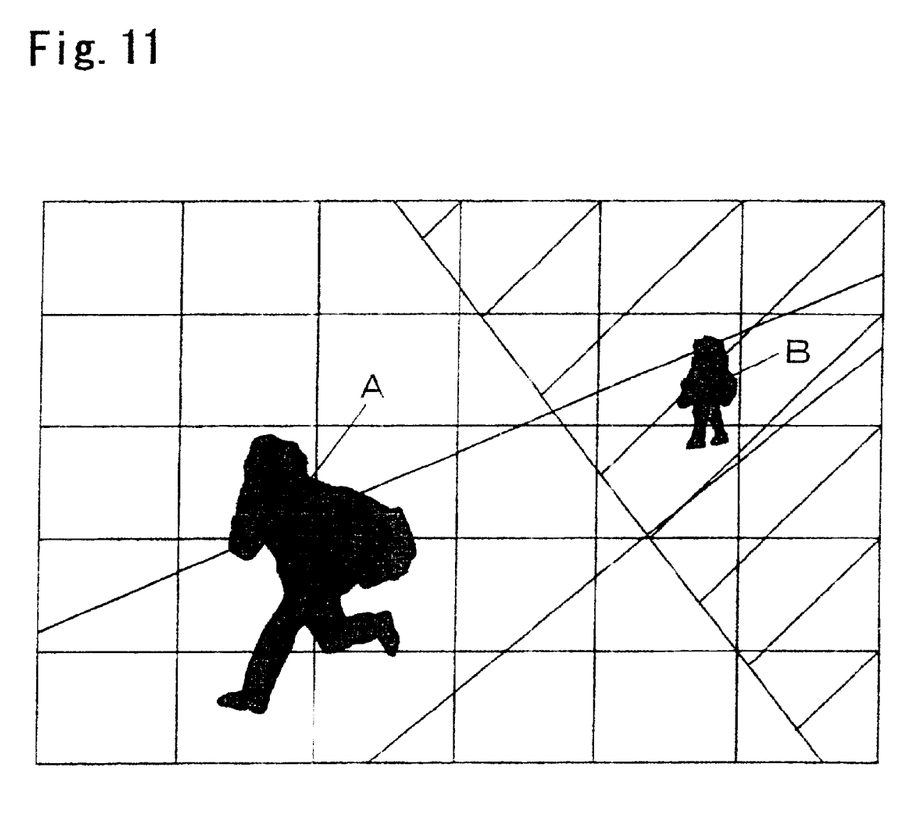
FIG. 11 is an exemplary diagram of a human region of the human tracking device according to one embodiment of the present invention.

Finally, as shown in FIG. 11, two blocks, i.e. block A and block B, are produced. While NEAR_FLAG is set to a close-by image of a man (block A), FAR_FLAG is set to a distant image of a woman (block B).

Figure 4:
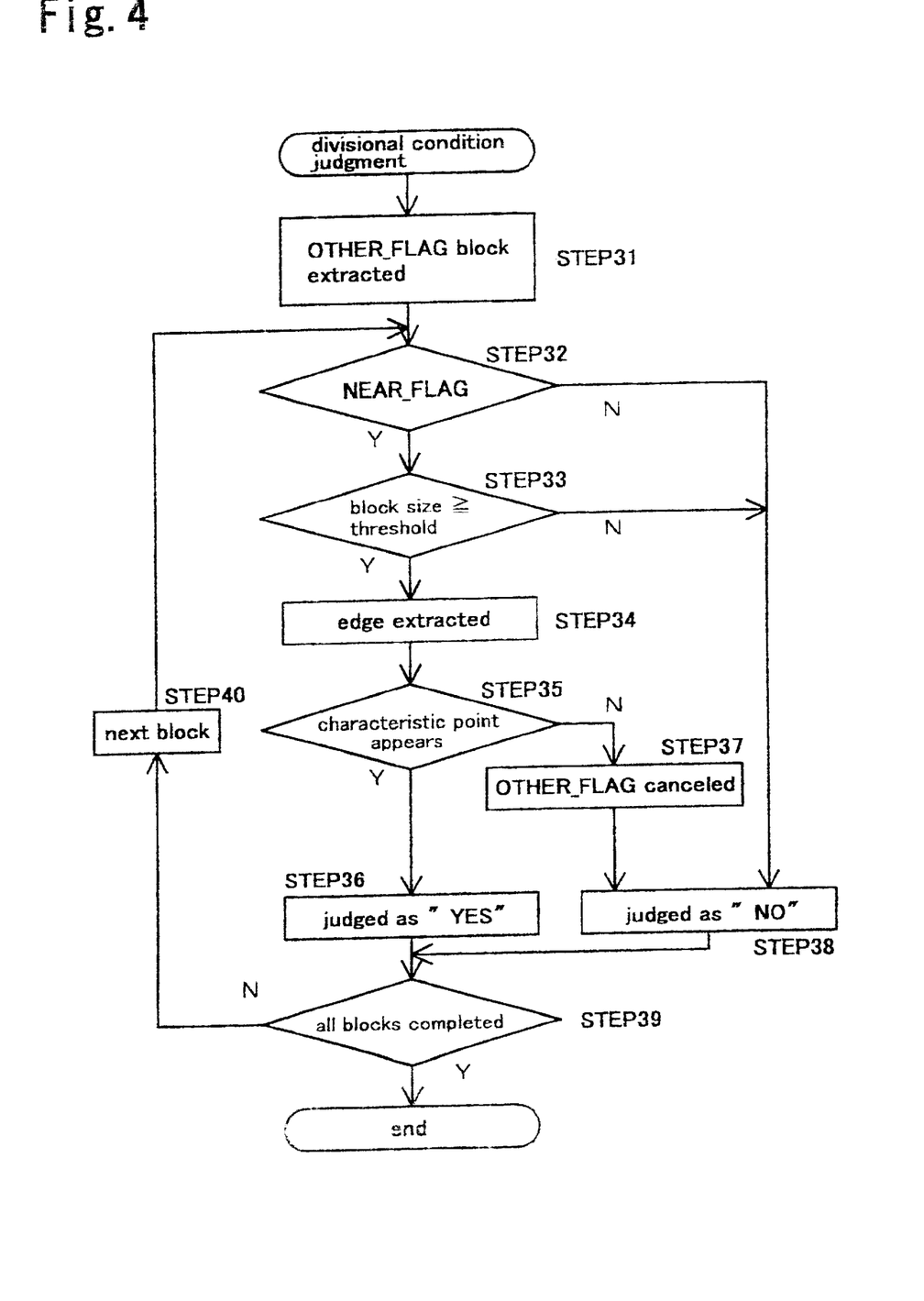
FIG. 4 is a flowchart of divisional condition judgment of the human tracking device according to one embodiment of the present invention.

Next, with reference to FIG. 4, the operation of the divisional condition judgment means 8 will be described. First, at Step 31, the block to which OTHER_FLAG is set is extracted. Then, the extracted block is checked to determine whether that NEAR_FLAG is set to this block (Step 32). If NEAR_FLAG is not set thereto, this block is judged as "NO". Then, in comparison of the size of the block with a threshold value (Step 33), when the size of the block is below the threshold value, this block is also judged as "NO".

On the other hand, if the size of the block is above the threshold value, this block is subjected to high-frequency filtering to extract the edge thereof (Step 34), which is thereafter subjected to Hough transform to examine whether a characteristic point appears (step 35). The appearance of a characteristic point means that a near-circular graphic pattern (face) is contained in the block. Therefore, this block is recognized as representing a human image, and is judged as "YES" (STEP 36).

If a characteristic point does not appear, this block is recognized as representing a newly placed object (for example, daily necessities or the like). Thus, OTHER_FLAG is canceled from this block (Step 37), and this block is judged as "NO". With the cancellation of OTHER_FLAG, this block is considered hereafter as representing a part of the background (a new background), which serves as the occasion to update the background blob models. The above processing are repeated for all blocks (Steps 39 and 40).

Figure 5:
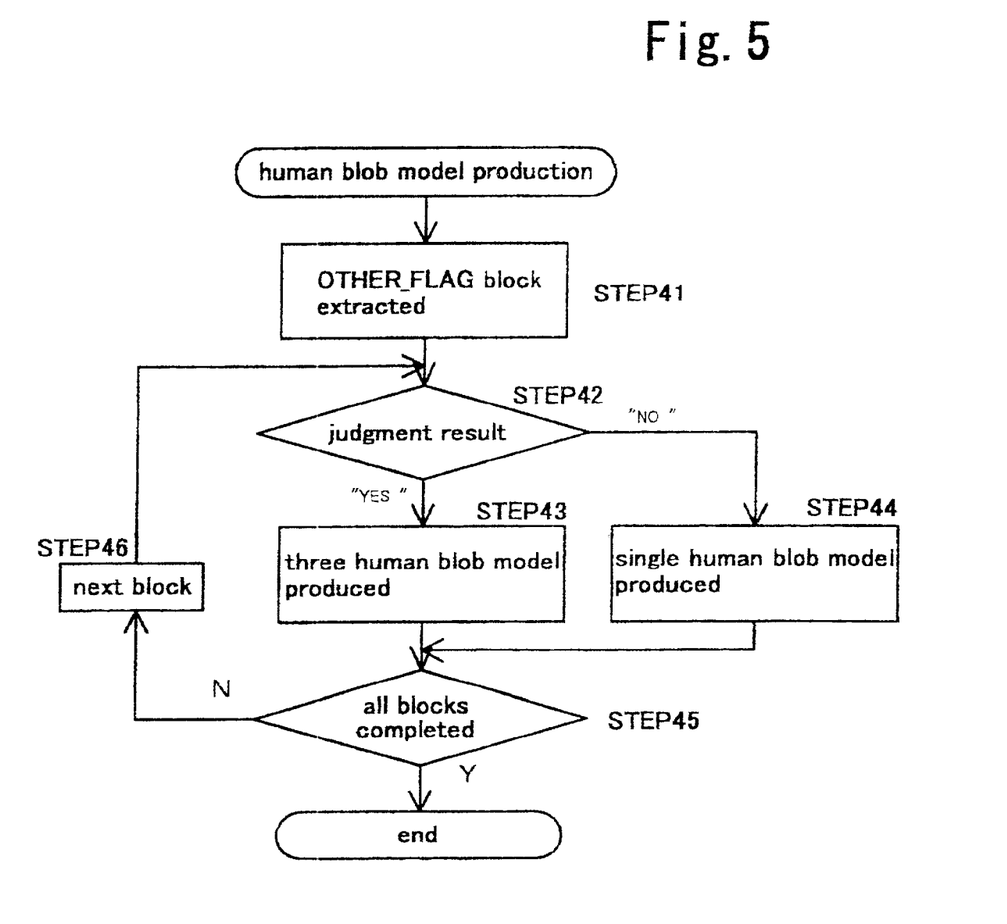
FIG. 5 is a flowchart of human blob model production of the human tracking device according to one embodiment of the present invention.

Next, with reference to FIG. 5, the operation of the human blob model production means 9 will be described. First, at Step 41, the block to which OTHER_FLAG is set is selected. At Step 42, the result of the judgment is examined. If the result of the judgement is "YES", three human blob models, that is, those of the face, the trunk and the legs, are produced as described above (Step 43). If the result is "NO", a single human blob model is produced (Step 44). Then, the above processing is repeated for all blocks (Steps 45 and 46).

Figure 12:
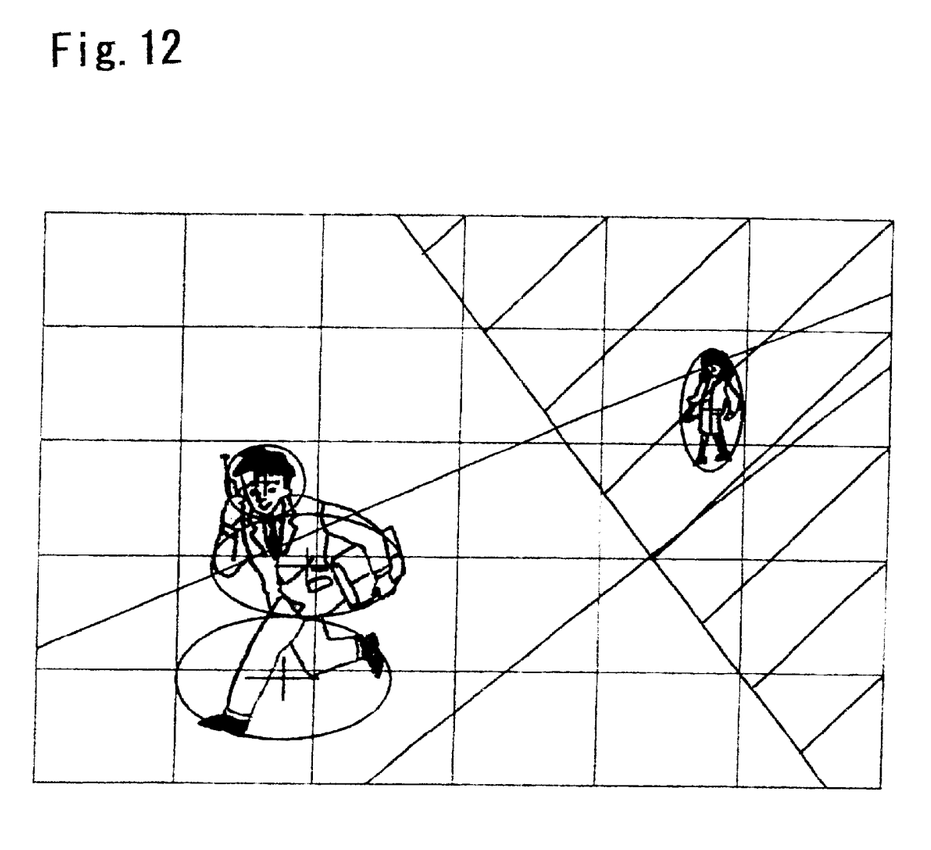
FIG. 12 is an exemplary diagram of a human blob model of the human tracking device according to one embodiment of the present invention.

As a result of the above processing, in this embodiment, the human blob models as shown in FIG. 12 are produced. Specifically, on the man's image which is close and large, three human blob models, that is, those of the face, the trunk and the legs, are produced. On the woman's image which is distant and small, a single human blob model is produced.

When the woman comes toward the close-by region with the passing of time, NEAR_FLAG is therefore set to the woman's image, and three human blob models of the face, the trunk and the legs are produced thereon. On the other hand, when the man turns around and goes away toward the distant region, OTHER_FLAG is therefore set to the man's image, and a single human blob model is produced as the man's image.

It is noted that "recording medium" mentioned in this specification includes a case in which the program is spread over a plurality of record media and distributed. Additionally, regardless of whether the program is a part of an operating system or not, if the program causes some of the functions thereof to be performed by various processes or threads_iDLL, OCX, Active X, etc., (including the trademarks of Microsoft Corporation), "recording medium" includes a case in which a part concerning the functions performed by them is not stored in the recording medium.

A standalone type system is shown in FIG. 1. Instead, a server/client type system can be used. In other words, instead of having all elements appearing in the specification contained in a single terminal unit, the present invention includes the case in which one terminal unit is a client, and all of or a part of the elements exist in a server or network connectable to the client.

A case is also allowable in which the server side has almost all the elements of FIG. 1, and the client side has, for example, a WWW browser only. Normally, various information is located on the server, and is distributed to the client basically through a network. In this case, when necessary information is located on the server, a storage device of the server is the "recording medium" mentioned above, and, when the information is located on the client, a storage device of the client is the "recording medium".

In addition to an application that is compiled to be a machine language, the "program" includes a case in which the application exists as an intermediate code interpreted by the aforementioned process or thread, a case in which at least a resource and a source code are stored on the "recording medium", and a compiler and a linker that can generate the application of a machine language from them are located on the "recording medium", or a case in which at least the resource and the source code are stored on the "recording medium", and an interpreter, that can generate the application of the intermediate code from them, is located on the "recording medium".

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A human tracking device comprising:
    region division means for dividing a camera image into at least a human region and a background region;
    divisional condition judgment means for judging whether said human region can be divided into a plurality of blob models corresponding to parts of a human;
    human blob model production means for producing a plurality of human blob models based on said human region when a result of said judging by said divisional condition judgment means is YES, and for producing a single human blob model based on said human region when a result of said judging by the divisional condition judgment means is NO; and
    human tracking means for tracking said human based on said human blob models.

2. The human tracking device according to claim 1, wherein said plurality of blob models are three blob models of head, trunk and legs of a human.

3. The human tracking device according to claim 1, wherein said divisional condition judgment means gives a result of said judging with reference to distance information of said human region.

4. The human tracking device according to claim 1, wherein the divisional condition judgment means gives the result of the judgment with reference to size of the human region.

5. The human tracking device according to claim 1, comprising background blob model production means for producing a plurality of background blob models based on the background region.

6. The human tracking device according to claim 5, wherein the region division means obtains a minimum value of similarity between the pixel and the background blob model, and judges that the pixel does not correspond to the background region when the minimum value is above a threshold value.

7. The human tracking device according to claim 5, wherein the background blob model is expressed to include X-Y coordinate average values and RGB average values of the region.

8. A human tracking method comprising the steps of:
    dividing a camera image into at least a human region and a background region;
    judging whether the human region can be divided into a plurality of blob models corresponding to parts of a human;
    producing a plurality of human blob models based on the human region when a result of judging step is YES;
    producing a single human blob model when a result of the judging step is NO; and
    tracking said human based on these human blob models.

9. The human tracking method according to claim 8, wherein the step of producing a plurality of blob models include producing blob models of a head, trunk and legs of said human.

10. The human tracking method according to claim 8, wherein the step of judging is performed with reference to distance information of said human region.

11. The human tracking method according to claim 8, wherein the step of judging is performed with reference to a size of said human region.

12. The human tracking method according to claim 8, further comprising producing a plurality of background blob models based on the background region.

13. The human tracking method according to claim 12, wherein:

the step of dividing includes obtaining a minimum value of similarity between each pixel and said background blob model; and judging that a pixel does not correspond to the background region when said minimum value is above a threshold value.

14. The human tracking method according to claim 12, wherein said background blob model includes at least X-Y coordinate average values and RGB average values of said background region.

15. A recording medium recording a human tracking program comprising the steps of:

region division means for dividing a camera image into at least a human region and a background region;

divisional condition judgment means for judging whether the human region can be divided into a plurality of blob models corresponding to parts of a human;

human blob model production means for producing a plurality of human blob models based on said human region when a result of said judging by the divisional condition judgment step is YES, and for producing a single human blob model based on said human region when the result of said judging by the divisional condition judgment step is NO; and human tracking means for tracking said human based on said human blob models.

* * * * *